UNITED STATES PATENT OFFICE.

BENEDICKT EHMAN, OF BROWNWOOD, TEXAS.

COMPOSITION OF MATTER FOR REMOVING GREASE, &c.

SPECIFICATION forming part of Letters Patent No. 491,413, dated February 7, 1893.

Application filed July 2, 1892. Serial No. 438,774. (No specimens.)

*To all whom it may concern:*

Be it known that I, BENEDICKT EHMAN, a citizen of the United States, residing at Brownwood, in the county of Brown and State of Texas, have invented certain new and useful Improvements in Composition of Matter for Removing Grease, &c.; and I do declare the following to be a full, clear, and exact description of the invention, such as will enable others skilled in the art to which it appertains to make and use the same.

This invention relates to a composition of matter, to be used for the removal of grease, oil, paint, and the like, from cloth, and is more particularly designed to be used on delicate silks, linens, &c.

In preparing the compound, I take gasoline, one (1) gallon, sulphuric ether, one and one fourth ounces, chloroform five ounces, alcohol three (3) ounces, spirits of ammonia three (3) ounces, borax (powdered) one ounce, carbonate of soda (powdered) one and three fourths ounces, saltpeter (in lumps) one ounce. These ingredients are to be thoroughly mixed, and let stand from twenty-four to forty-eight hours, or until most of the borax or carbonate of soda is dissolved, when the compound is ready for use.

In using the preparation for the removal of grease, oil, or paint, spots, I place a cloth under the article to be treated, and pour a sufficient quantity of the compound upon the soiled or stained place, when by rubbing it with a cloth, the soil or stain will disappear. I have found in removing paint that it is well to wet the article with water mixed with turpentine, alcohol, and ammonia, and these parts may be combined in the proportions of one pint of water, to three ounces each of turpentine, alcohol, and ammonia, while in removing paint from silk, it is necessary to soak the material in a little chloroform.

This compound may be also used in dyeing, when artists' oil colors (or tube points) should be mixed with the compound until brought to about the consistency or thickness of milk. This may be applied with a rag, but in dyeing plumes and ribbons, they should be immersed in the preparation. During the many experiments which I have made, I have found that the proportions in which the ingredients are combined are very essential to good practical results. I have also found it necessary to powder the borax and also the carbonate of soda before placing them in the compound, as when placed in a lump state or condition, they are slow to dissolve and owing to the great length of time necessary to dissolve them, a chemical action takes place leaving the compound in a brown, oily state which when used on delicate colors leaves a soiled spot. The saltpeter is highly essential as a purifier, and renders the composition suitable for treating the finest and most delicate fabrics.

Having described my invention what I claim is:

The compound described, consisting essentially of gasoline, chloroform, sulphuric ether, alcohol, spirits of ammonia, powdered borax, powdered carbonate of soda, and saltpeter in lumps, combined in the proportions and manner, substantially as herein set forth.

BENEDICKT EHMAN.

Witnesses:
LAZARUS RIESS,
RAPHAEL SOKOLSKY.